J. A. REID.
WHEEL RIM.
APPLICATION FILED JUNE 16, 1915.
1,159,797.
Patented Nov. 9, 1915.
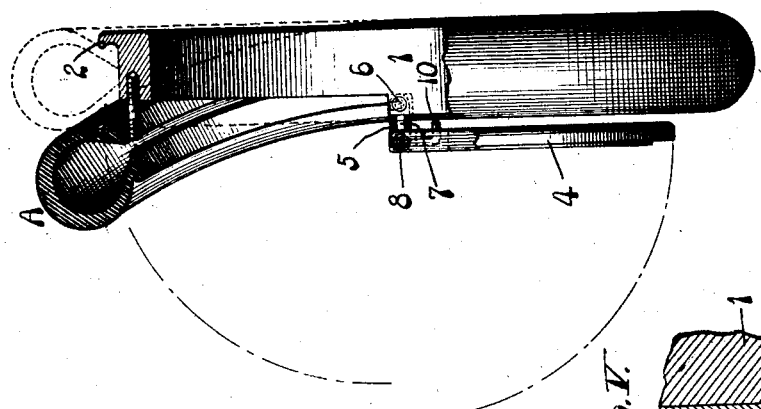
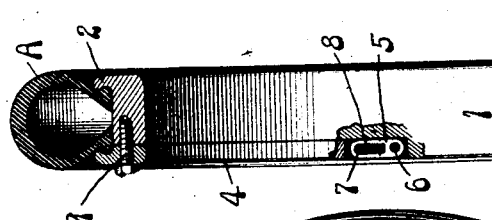
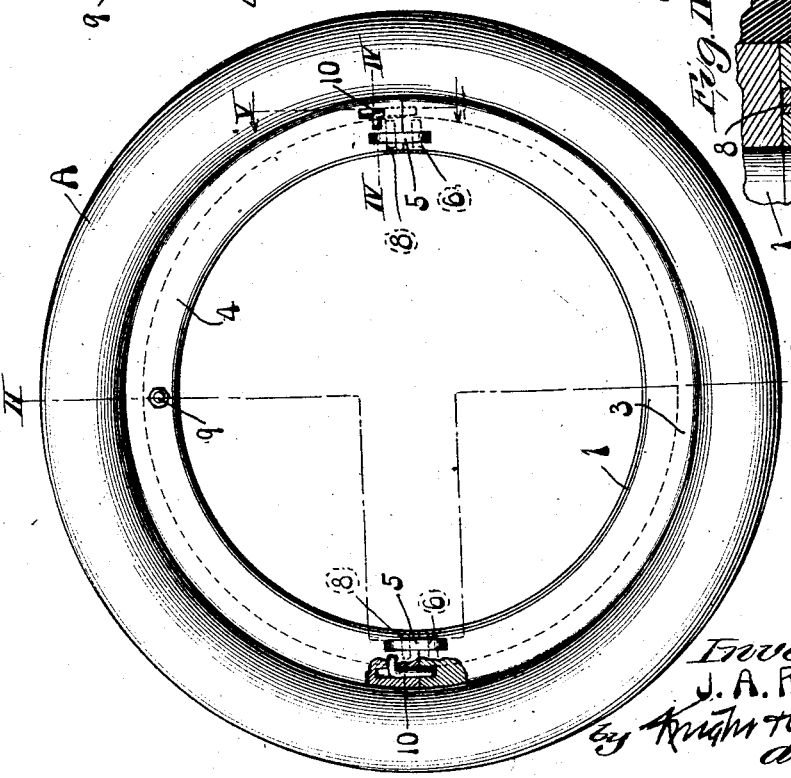
Inventor:
J. A. Reid
by Knight & Cook
attys.

UNITED STATES PATENT OFFICE.

JAMES A. REID, OF WENTZVILLE, MISSOURI.

WHEEL-RIM.

1,159,797.  Specification of Letters Patent.  Patented Nov. 9, 1915.

Application filed June 16, 1915. Serial No. 34,351.

*To all whom it may concern:*

Be it known that I, JAMES A. REID, a citizen of the United States of America, a resident of Wentzville, in the county of St. Charles, State of Missouri, have invented certain new and useful Improvements in Wheel-Rims, of which the following is a full, clear, and exact description, reference being had to the accompanying drawings, forming a part of this specification.

My invention relates to a wheel rim for the reception of pneumatic tires, the invention having for its object to provide a wheel rim so constructed as to minimize the labor and trouble incident to the application of a tire thereto and the removal of the tire from the rim.

Figure I is a side elevation of my tire rim with a tire thereon, the rim being shown partially in section to show one of the slidable dowels. Fig. II is a section taken on irregular line II—II, Fig. I. Fig. III is in part an elevation, looking at the tread of the tire, and in part a cross section, the movable segment of the rim being in abnormal position. Fig. IV is an enlarged cross section taken on line IV—IV, Fig. I. Fig. V is an enlarged section taken on line V—V, Fig. I.

In the drawings: 1 designates the body of my wheel rim, the said body being provided at one side with a continuous peripheral flange 2, and at its other side with a segmental peripheral flange 3 extending only partially around the rim. The flanges 2 and 3 have opposing inner faces between which the edges of a tire A may be held.

The body of the wheel rim is cut away, at the side at which the segmental flange 3 is located, to render the rim body flangeless at such side throughout its circle aside from that portion occupied by the segmental flange 3. This construction of the rim body permits of the ready and easy application of a tire to the rim by placing a portion of the tire between the continuous flange 2 and the segmental flange 3 and then slipping the remainder of the tire onto the rim at the region where there is absence of side flange and consequently no obstruction to interfere with lateral movement of the tire.

4 designates a movable flange segment which occupies the cut away portion of the rim body 1 when the rim is in service and serves to hold the tire at the region where there is absence of a fixed flange. This flange segment is pivotally connected to the rim body at the ends of the segmental flange 3 by links 5. Each of said links is secured to the flange 3 by a pivot pin 6 extending transversely of the axis of the rim, and each link contains a longitudinal slot 7 which receives a pin 8 in the movable flange segment 4. The loose attachment of the flange segment 4 to the rim body permits of said segment being swung from its normal tire holding position to a position in which it lies alongside of the fixed segmental flange 3 as seen in Fig. III. When the flange segment 4 is located as last mentioned a tire may be placed on the rim or removed therefrom without the necessity of forcing it over a continuous flange, and it will be readily apparent that the tire may be applied and removed much more quickly and easily than is possible in the use of a rim having two continuous side flanges which are permanently secured to the rim body.

Any suitable means may be utilized to retain the movable flange segment in tire holding position, the means shown in the drawing comprising a pin 9 seated in the body of the rim and passing through the flange segment. The pin may have a nut on its outer end or it may be in the form of a screw.

Dowels 10 slidably seated in the flange segment 4 serve to hold the ends of this segment firmly in alinement with the segmental flange 3. The dowels are arranged in bores 4' extending from pockets 4ª in the outer sides of the flange segment and seat in recesses 1ª in the segmental flange 3, as seen in Fig. V. Each dowel is preferably formed with an angular finger piece to be engaged by the operator when shifting the dowel, these finger pieces normally occupying the pockets 4ª but being adapted to be moved outwardly, as shown in dotted lines, Fig. V, to facilitate longitudinal movement of the dowels.

I claim:—

1. A wheel rim comprising a body having a segmental tire holding flange at one of its sides, a tire holding flange segment, and links connecting the ends of said flange segment to said body at the ends of said segmental flange.

2. A wheel rim comprising a body having a segmental tire holding flange at one of its sides, a tire holding flange segment, and slotted links connecting the ends of said flange segment to said body at the ends of said segmental flange.

3. A wheel rim comprising a body having a fixed segmental tire holding flange at one of its sides, a tire holding flange segment pivoted to said body at the ends of said segmental flange, and dowels holding the pivotal ends of said flange segment in alinement with said fixed segmental flange.

4. A wheel rim comprising a body having a fixed segmental tire holding flange at one of its sides, a tire holding flange segment pivoted to said body at the ends of said segmental flange, and dowels slidably arranged in the pivotal ends of one of said parts adapted to engage the other part to hold said flange segment in alinement with said segmental flange.

J. A. REID.